June 30, 1931.  E. W. STEVENS  1,812,726

PEENING APPARATUS

Filed Dec. 17, 1927

INVENTOR.
Edward W. Stevens

BY

Ira L. Nickerson
ATTORNEY.

Patented June 30, 1931

1,812,726

UNITED STATES PATENT OFFICE

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY

PEENING APPARATUS

Application filed December 17, 1927. Serial No. 240,674.

This invention relates to apparatus for securing an elongate member in a channeled support. It has particular application to electric railways using an overhead system in the solution of the problem of securing a trolley wire in the suspension members, but the invention is by no means confined thereto.

For supporting a trolley wire it is customary to use elongate brass or bronze suspension members having a fairly deep channel or groove to receive the trolley wire. While brazing or soldering the wire to the supporting members has been practiced, the usual method is to hammer or peen the flanges of the members into gripping engagement with the wire, hand hammers being used for this purpose. As practiced, such methods are time-consuming and unless the work is carefully and accurately performed the joints are likely to be rough and irregular with the result that the trolley wheel tends to jump or to be thrown from the wire when moving along the latter at high speed.

Among the objects of the invention are effectively to secure an elongate member in a channeled support with a minimum of time and effort, to make a smooth and uniform joint, and in general to simplify and to improve prior methods and apparatus for performing such work.

The invention consists in the provision of a saddle arranged to engage the support and provided with guides or slides supporting a power-operated percussive machine. A working tool having a recess or notch which is generally concave transmits the blows of the percussive machine to the flanges of the support, and the machine with the working tool is arranged to be moved back and forth along the saddle while the process of peening the support is carried on.

In order to illustrate the invention one concrete embodiment thereof is shown in the accompanying drawings in which.

The form of apparatus chosen for the purpose of illustrating the invention is adapted for the erection of overhead trolley systems in which an elongate member, such as a trolley wire A, is arranged to be securely fastened in a relatively deep groove provided by the flanges $b$ of a suspension support B. The apparatus consists of means conveniently applied to and removed from the suspension support and arranged to guide a percussion member along the support to peen the flanges $b$ of the latter into gripping contact with trolley wire A and to make a smooth joint of the connection. The means consists of a frame which may be generally U-shaped or V-shaped in end elevation (Figs. 3 and 4) arranged to dispose one or more guide members or rails 7 in spaced relation to support B and the wire A.

Figure 2:
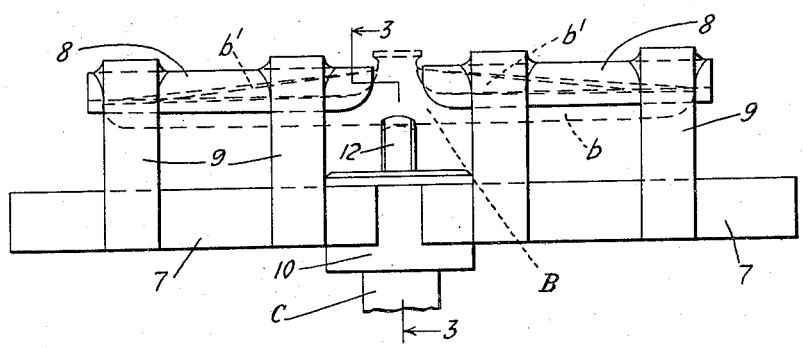
Fig. 2 is a side elevational view on an enlarged scale disclosing the apparatus in its normal operating position, a trolley suspension support being indicated in broken outline.
Figure 1:
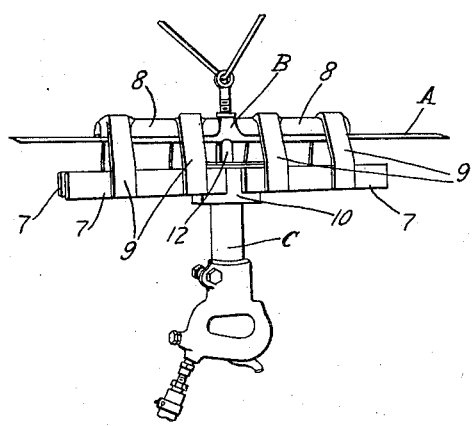
Fig. 1 is a perspective view illustrating the peening apparatus in position upon a trolley wire.

By preference the frame has a saddle member 8 fitting the contour of support B and having a central axial groove $8a$ to receive the strengthening rib $b'$ on the back, or upper side, of support B. The entire frame may be forged, or cast, in one piece, or the guide rails 7 may be suspended from saddle 8 by straps or arms 9 secured to members 7 and 8 in any suitable manner, as by welding. By preference two identical frames are used, one on either side of the suspension boss of member B, as indicated in Figs. 1 and 2. Slidably supported on the guides or rails 7, for movement longitudinally of the support B, is a carriage 10 in the form of a block which, in the form shown, fits between the spaced parallel guide rails 7 and has overhanging flanges $10a$ resting on the rails. Carriage 10 has a bore 11 therethrough in the central axial plane defined by saddle 8 and support B through which bore there projects with a sliding fit a working tool 12. The working tool has a collar 12a and a shank 12b which extend axially of a threaded counterbore 11a in carriage 10, the shoulder 11b formed by the counterbore serving as a retaining stop for collar 12a. The shank 12b of the working tool is arranged to receive blows from any suitable source.

By preference a power-operated percussive machine, such as a pneumatic hammer C, is used for the above purpose. The percussive machine may be secured to carriage 10 in any suitable manner, as by providing the end of the machine with screw-threads which cooperate with the threaded counterbore 11a. With this arrangement carriage 10 serves as a front head for the percussive machine and supports the same for sliding movement axially of the frame or frames, the working tool 12 being retained between the threaded end of the percussive machine and the internal shoulder 11b of carriage 10.

Figure 3:
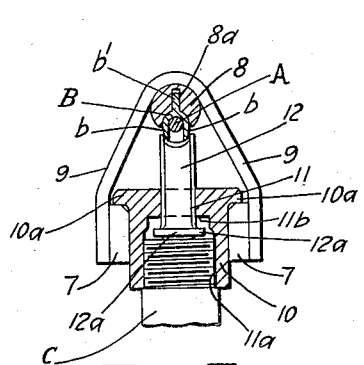
Fig. 3 is a sectional view substantially on the line 3—3 of Fig. 2 indicating the position of the parts before the peening operation begins.
Figure 4:
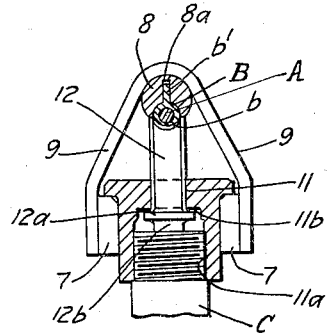
Fig. 4 is a view similar to Fig. 3 indicating the completion of the peening operation.
Figure 5:
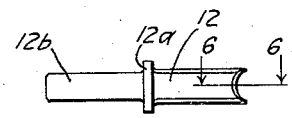
Fig. 5 is a plan view of the working tool.
Figure 6:
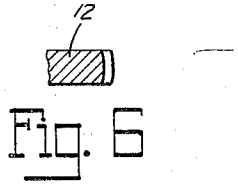
Fig. 6 is a fragmentary sectional view on the line 6—6 of Fig. 5.

The outer end of the working tool has a rounded recess or concave notch adapted to receive or to fit over the flanged part of suspension member B, as indicated in Fig. 3, with the result that blows imparted to the working tool by the percussion machine C operate to peen over the flanges b into tight gripping engagement with the wire A, as indicated in Fig. 4. To insure a smooth and even joint the rear wall of the notch of the working tool, when viewed axially of the notch, is slightly convex, as shown in Fig. 6.

In operation the frame members are placed over support B with saddle portions 8 in contact with the latter. Carriage 10 with its percussive machine C secured thereto and with a working tool 12 projecting from bore 11 is disposed with its overhanging flanges 10a in line with the top of guides 7, and the carriage is slid into one of the frames through the open end of the latter until the midpoint of the support B is reached, the carriage then being partly supported by both frames (Figs. 1 and 2). The percussive machine is then put into operation, as by opening the throttle valve of the pneumatic hammer shown in the drawing, and while the hammer is in operation the carriage is slid back and forth along support B. The rapid blows of the percussive machine are transmitted to the flanges b which are quickly peened over the wire, as shown in Fig. 4. the backing given to support B by saddle 8 and the peculiar form of the notched end of the working tool 12 making a smooth joint entirely free from rough spots and irregularities.

With this apparatus the fastening of a trolley wire or other elongate member in a suspension support is a matter of seconds only and the resulting joint is decidedly superior to that provided by methods heretofore practiced.

While a preferred form of the invention has been herein shown and described, it is to be understood that the invention is not limited to the specific details thereof, but covers all changes, modifications, and adaptations within the scope of the appended claims.

I claim as my invention:—

1. In apparatus of the class described, a member arranged to engage a grooved support, a percussive machine supported by said member and means on said member arranged to guide said machine for movement longitudinally of said support for peening the latter into gripping engagement with an elongate member received in the groove of said support.

2. Apparatus for engagement with a supporting member having a groove and an elongate member seated in said groove for the purpose of closing the grooved member over the elongate member, comprising a frame arranged for quick application to and removal from said members, a percussive machine, and means supporting said machine on said frame for movement longitudinally of said members.

3. Apparatus for engagement with a supporting member having a groove and an elongate member seated in said groove for the purpose of closing the grooved member over the elongate member, comprising a frame in the form of a saddle arranged to be passed freely over said members and to seat upon said supporting member, a guide on said frame at a point remote from said members, and a percussive machine movable along said guide for closing the grooved member with a peening action.

4. Apparatus for engagement with a supporting member having a groove and an elongate member seated in said groove for the purpose of closing the grooved member over the elongate member, comprising a frame in the form of a saddle arranged to be passed freely over said members and to seat upon said supporting member, a guide on said frame at a point remote from said members, a carriage movable along said guide, and a percussive machine supported by said carriage for closing the grooved member with a peening action.

5. Apparatus for engagement with a supporting member having a groove and an elongate member seated in said groove for the purpose of closing the grooved member over the elongate member, comprising a frame in the form of an elongate U-shaped saddle arranged to be passed freely over said members and to seat upon said supporting member, guiding means longitudinally disposed in the sides of the said U-frame, a carriage slidably received on said guiding means, a percussive machine supported by said carriage, and a working tool receiving the blows of said machine for closing the grooved member with a peening action.

6. Apparatus for engagement with a supporting member having a groove and an elongate member seated in said groove for the purpose of closing the grooved member over the elongate member, comprising a frame in the form of an elongate U-shaped saddle arranged to be passed freely over said members and to seat upon said supporting member, guide tracks upon the sides of the said U-frame, a carriage having extended flanges arranged to engage said tracks, a percussive machine supported by said carriage, and a working tool receiving the blows of said machine for closing the grooved member with a peening action.

7. Apparatus for engagement with a supporting member having a groove and an elongate member seated in said groove for the purpose of closing the grooved member over the elongate member, comprising a frame arranged for quick application to and removal from said members, a carriage slidably supported by said frame for movement longitudinally of said members, said carriage having a working tool projecting therefrom in the plane defined by said members for peening the grooved member into tight gripping engagement with said elongate member.

8. Apparatus for engagement with a supporting member having a groove and an elongate member seated in said groove for the purpose of closing the grooved member over the elongate member, comprising a frame arranged for quick application to and removal from said members, a carriage slidably supported by said frame for movement longitudinally of said members, said carriage having a working tool projecting therefrom in the plane defined by said members for engagement with the latter, and a percussive machine arranged to impart blows to said tool for peening the grooved member into gripping engagement with said elongate member.

9. Apparatus for engagement with a supporting member having a groove and an elongate member seated in said groove for the purpose of closing the grooved member over the elongate member, comprising a frame arranged for quick application to and removal from said members, a carriage slidably supported by said frame for movement longitudinally of said members, said carriage having a bore therethrough in the plane defined by said members and substantially perpendicular to said members, the portion of the bore remote from said members being counterbored, a collared working tool extending through said bore to engage said members and having its collared portion received in said counterbore, and a percussive machine extending into said counterbore for imparting blows to said working tool for peening the grooved member into gripping engagement with said elongate member.

10. Apparatus for engagement with a trolley wire and a grooved suspension support therefor for the purpose of closing the grooved support over the wire, comprising an elongate frame generally U-shaped having a socket member or saddle for seating engagement with said support and having the other end open, the arms of said frame providing tracks, a carriage slidable on said tracks, a working tool projecting from said carriage to engage the grooved portion of said support, and a pneumatic hammer removably secured to said carriage for delivering blows upon said tool for peening the support into gripping contact with the trolley wire.

11. Apparatus for engagement with a trolley wire and a grooved suspension support therefor for the purpose of closing the grooved support over the wire, comprising an elongate frame generally U-shaped having a socket member or saddle for seating engagement with said support and having the other end open, the arms of said frame providing tracks, a carriage slidable on said tracks, said carriage having a bore therethrough substantially perpendicular to the wire and its support, the portion of the bore remote from said wire being counterbored, a working tool extending through said bore and having a collar of greater diameter than the bore but of less diameter than the counterbore, and a pneumatic hammer having threaded engagement with the counterbore of said carriage for imparting blows to said working tool for peening the support into gripping contact with the trolley wire.

12. In apparatus of the class described, a frame providing a saddle adapted to be hooked over a suspension support for a trolley wire or the like and providing a guide or trackway in spaced relation to, but in a substantial parallelism with, the saddle portion.

13. In apparatus of the class described, an elongate frame having spaced portions at its open side and providing a saddle at its closed side adapted to rest upon a suspension support for a trolley wire or the like, and means on said spaced portions providing guides or tracks in substantial parallelism with said saddle.

14. In apparatus of the class described, a saddle member adapted to be seated upon a suspension support for a trolley wire or the like, diverging arms extending from said saddle, and elongate guide rails secured to the opposing faces of said arms and in substantial parallelism with said saddle and with each other.

15. A carriage for supporting a percussive machine, comprising a member having means adapting the same to be slidably supported, said member having a bore therethrough into which a percussive machine is adapted to extend, the bore beyond the machine being reduced so as to retain therein a collared working tool with the bit end thereof projecting through the bore and beyond said member.

16. A carriage for supporting a percussive machine, comprising a block having extended flanges for slidably supporting the same, said block having a bore therethrough one end of which is counterbored and threaded for receiving the corresponding threaded end of a pneumatic hammer, the shoulder within the bore formed by the counterbore being adapted to retain a collared working tool in operative engagement with the hammer while the bit end of the tool extends through the bore beyond the block.

Signed by me at Detroit, in the county of Wayne and State of Michigan, this 14 day of December, 1927.

EDWARD W. STEVENS.